US009815550B2

(12) United States Patent
Nicolas et al.

(10) Patent No.: US 9,815,550 B2
(45) Date of Patent: Nov. 14, 2017

(54) AIRCRAFT TAXIING SYSTEM

(71) Applicants: AIRBUS SAS, Blagnac (FR); Airbus Operations S.A.S., Toulouse (FR)

(72) Inventors: Yann Nicolas, Tournefeuille (FR); Philippe Tatry, Balma (FR); Matthieu Bradier, Toulouse (FR); Nicolas Sanz, Toulouse (FR)

(73) Assignees: AIRBUS SAS (FR); Airbus Operations S.A.S. (FR)

( * ) Notice: Subject to any disclaimer, the term of this patent is extended or adjusted under 35 U.S.C. 154(b) by 237 days.

(21) Appl. No.: 14/865,924

(22) Filed: Sep. 25, 2015

(65) Prior Publication Data

US 2016/0096618 A1 Apr. 7, 2016

(30) Foreign Application Priority Data

Oct. 3, 2014 (FR) ...................................... 14 59459

(51) Int. Cl.
*B64C 25/00* (2006.01)
*B64C 25/34* (2006.01)
(Continued)

(52) U.S. Cl.
CPC .............. *B64C 25/34* (2013.01); *B64C 25/02* (2013.01); *B64C 25/405* (2013.01); *H02P 3/12* (2013.01); *B64C 25/42* (2013.01); *Y02T 50/823* (2013.01)

(58) Field of Classification Search
CPC ............................... B64C 25/405; B64C 25/42
See application file for complete search history.

(56) References Cited

U.S. PATENT DOCUMENTS 7,226,018 B2 * 6/2007 Sullivan .................... B60L 7/26
244/111
8,835,035 B2 * 9/2014 Kim .................... H01M 2/1077
429/120

(Continued)

FOREIGN PATENT DOCUMENTS

EP    1867567 A1    12/2007
EP    2524867 A2    11/2012
FR    2997172 A1    4/2014

OTHER PUBLICATIONS

FR Search Report dated May 27, 2015 (FR 14 59459).

*Primary Examiner* — Philip J Bonzell
*Assistant Examiner* — Michael Kreiner
(74) *Attorney, Agent, or Firm* — Lerner, David, Littenberg, Krumholz & Mentlik, LLP

(57) ABSTRACT

A taxiing system for an aircraft including an undercarriage having a wheel, includes an electric motor associated with the wheel, an electric controller of the electric motor, connected to an output of an electrical power supply, and a taxiing control computer configured to determine control instructions for the electric motor and to transmit these instructions to the electric controller. The taxiing control computer is configured to receive braking of the aircraft commands during the taxiing of the aircraft and to determine control instructions for the electric motor corresponding to operation of the motor in generator mode when it receives a braking command. The electric controller is connected to an energy absorber making it possible to absorb the electric energy produced by the electric motor when the latter is operating in generator mode.

13 Claims, 10 Drawing Sheets

(51) Int. Cl.
  *H02P 3/12* (2006.01)
  *B64C 25/02* (2006.01)
  *B64C 25/40* (2006.01)
  *B64C 25/42* (2006.01)

(56) References Cited

U.S. PATENT DOCUMENTS

| | | |
|---|---|---|
| 9,540,097 B2 * | 1/2017 | Schmidt .................. B64C 25/12 |
| 2005/0207120 A1 * | 9/2005 | Tseng .................... H01L 23/427 |
| | | 361/700 |
| 2005/0224642 A1 | 10/2005 | Sullivan |
| 2012/0292437 A1 | 11/2012 | Garcia et al. |

\* cited by examiner

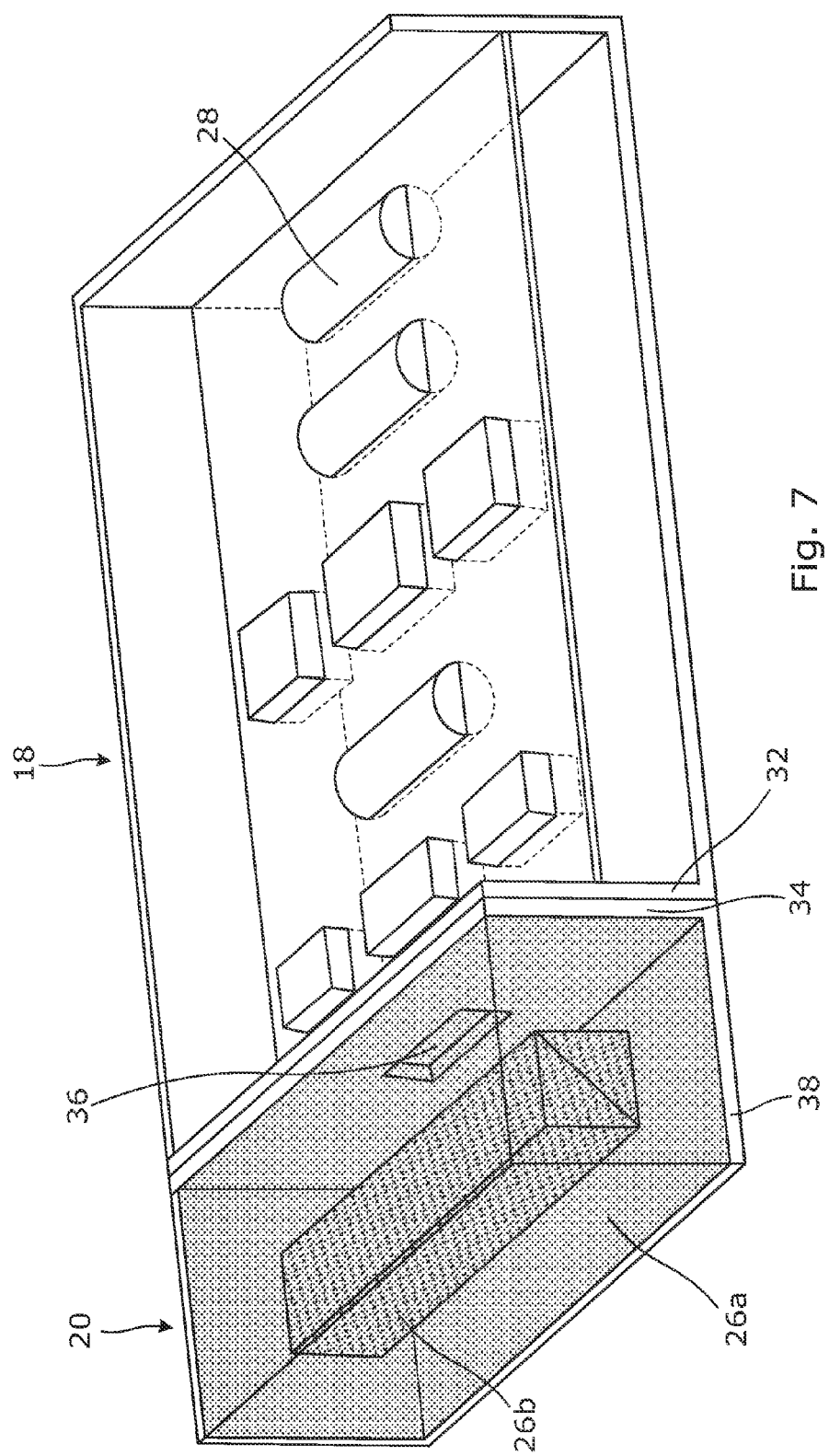

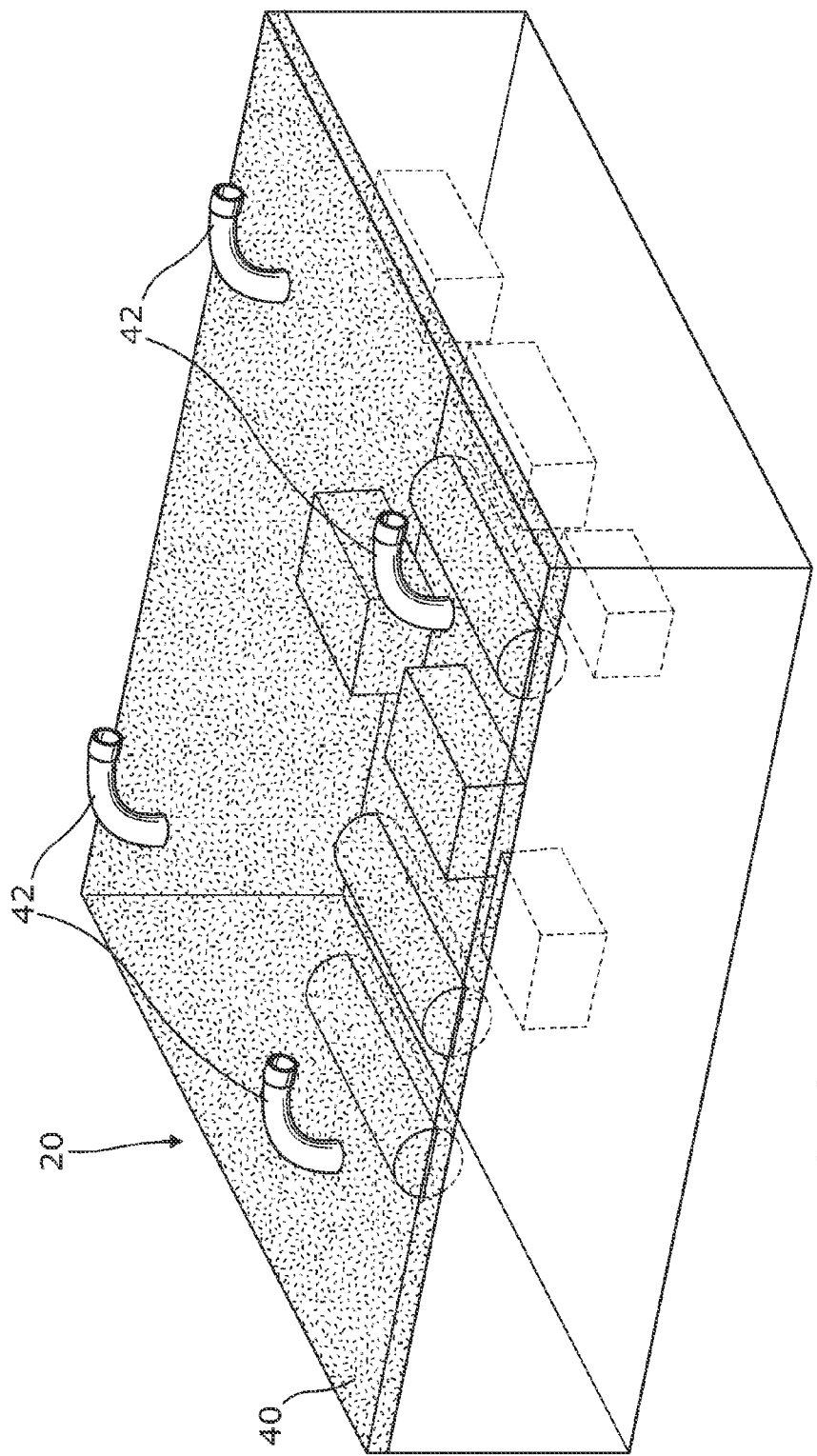

AIRCRAFT TAXIING SYSTEM

FIELD OF THE INVENTION

The invention relates to the movement on the ground of aircraft, of transport aircraft in particular, on airport surfaces.

BACKGROUND OF THE INVENTION

Movement on the ground is sometimes referred to by the English expression "taxiing." After its landing on a runway of an airport, an aircraft must taxi from said runway until it reaches its station, generally corresponding to a gate ("gate" being the English term) of the terminal of said airport. In order for it to take off, the aircraft must generally reverse from its station and then taxi to a runway of the airport chosen for the takeoff. Conventionally, the taxiing is carried out using the (heat) engines of the aircraft, the latter delivering a minimum thrust corresponding to a slow running speed of the engines (called IDLE in English). This minimum thrust is greater than the thrust necessary for the taxiing of the aircraft: consequently, the pilot of the aircraft is forced to use the brakes of the aircraft in order to control the taxiing speed. This results in useless fuel consumption by the engines of the aircraft, as well as a heating up and wearing of the brakes. Moreover, the aircraft cannot reverse independently in order to leave its station: it must be pushed by a tractor on the ground. A solution has been proposed in order to overcome these disadvantages, which consists of using at least one electric motor associated with at least one wheel of an undercarriage of the aircraft. This solution, called "eTaxi", makes it possible for the aircraft to taxi without necessitating the use of the heat engines.

This eTaxi method uses brakes associated with said at least one wheel in order to slow down the aircraft, when a braking of the latter is necessary during taxiing. However, it would be desirable to improve the stability of the aircraft, in particular when the latter is reversing.

BRIEF SUMMARY OF THE INVENTION

The present invention relates to a taxiing system for an aircraft, said aircraft comprising at least one undercarriage comprising at least one wheel, the taxiing system being installed onboard the aircraft and comprising:

an electrical power supply;

at least one electric motor associated with said at least one wheel;

an electric controller of said at least one electric motor, to which is electrically connected said at least one electric motor, said electric controller being electrically connected to an output of said electrical power supply; and a taxiing control computer connected to the electric controller and configured to determine control instructions for said at least one electric motor and to transmit these instructions to the electric controller, The taxiing system is noteworthy in that:

the taxiing control computer is configured to receive braking of the aircraft commands during the taxiing of the aircraft;

the taxiing control computer is configured to determine control instructions for said at least one electric motor corresponding to operation of said electric motor in generator mode when it receives a braking of the aircraft command; and the electric controller of said at least one electric motor is connected to an energy absorber making it possible to absorb the electric energy produced by said at least one electric motor when the latter is operating in generator mode.

This taxiing system uses said at least one electric motor in generator mode in order to brake the aircraft. Consequently, it makes it possible to brake the aircraft without using the brakes associated with said wheel. This results in an improvement of the stability of the aircraft, in particular when the latter has to brake whilst reversing.

According to an advantageous embodiment, the taxiing system comprises a heat absorber associated with the energy absorber, this heat absorber comprising at least one phase change material. This makes it possible to reduce the dimensions and the mass of the energy absorber.

According to particular ways of producing said advantageous embodiment, able to be taken into account individually or in combination:

the heat absorber comprises a plurality of partitions disposed substantially vertically, these partitions delimiting a plurality of volumes containing said at least one phase change material;

the heat absorber comprises a first type of phase change material and a second type of phase change material;

a first part of said plurality of volumes contains the first type of phase change material and a second part of said plurality of volumes contains the second type of phase change material;

the first type of phase change material is contained in a first volume, the second type of phase change material is contained in a second volume, and the second volume is included in the first volume;

said at least one phase change material is contained inside the energy absorber;

said at least one phase change material is in contact with electrical components of the energy absorber;

said at least one phase change material is at least partially contained in a volume situated between two layers of electrical components of the energy absorber;

said at least one phase change material is contained in an enclosure at least partially surrounding the energy absorber;

said at least one phase change material of the heat absorber is contained in an enclosure outside of the energy absorber, the heat absorber being connected to a part of the energy absorber containing electrical components by a heat bridge or by a heat pipe;

said at least one phase change material is contained in an enclosure comprising at least one flexible part capable of being deformed in order to absorb an increase of volume of said at least one phase change material under the effect of an increase of its temperature; and said at least one phase change material is contained in an enclosure comprising an upper face comprising at least one vent.

The invention also relates to an aircraft comprising a taxiing system such as mentioned above.

The invention will be better understood on reading the following description and on examining the appended figures.

BRIEF DESCRIPTION OF THE DRAWINGS

FIG. 7 shows a heat absorber of a taxiing system according to a fourth embodiment.

FIG. 8, shows a variant of the advantageous embodiment shown in FIG. 4.

DETAILED DESCRIPTION

Figure 1:
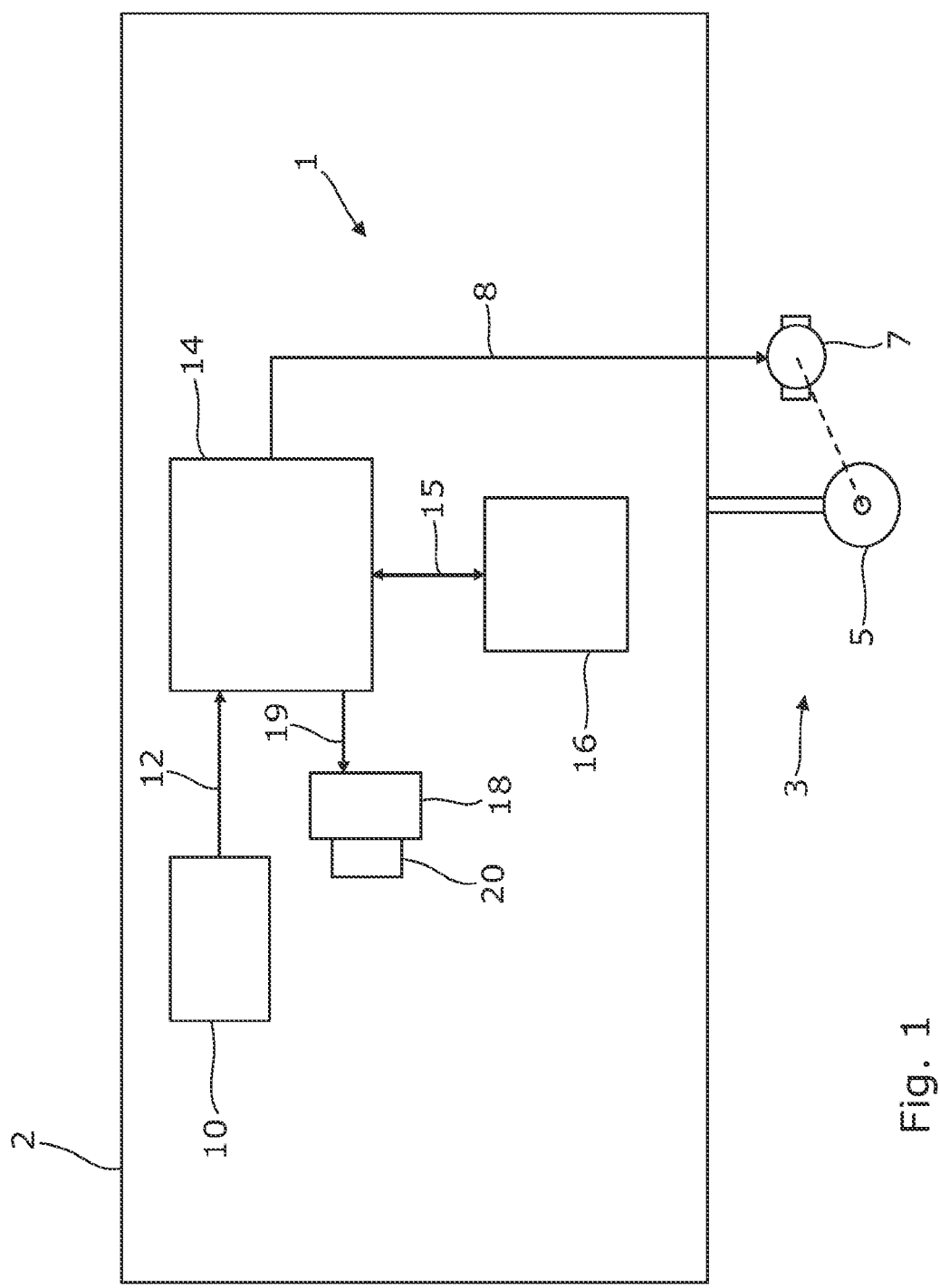
FIG. 1 shows, in a diagrammatic manner, a taxiing system according to one embodiment of the invention.

The taxiing system 1 of an aircraft 2 shown in FIG. 1 comprises an electric motor 7 associated with a wheel 5 of an undercarriage 3 of the aircraft. This taxiing system comprises an electrical power supply 10, an electric controller 14 of the electric motor 7, a taxiing control computer 16 and an energy absorber 18. The electric controller 14 of the electric motor is electrically powered by the electrical power supply 10 by means of a link 12. The electric motor 7 is electrically connected to the electric controller 14 by a link 8. The electric controller 14 of the electric motor is connected to the taxiing control computer 16 by a link 15. The energy absorber 18 is electrically connected to the electric controller 14 of the electric motor by a link 19. Although not obligatory, the link 19 can be equipotential with the link 12, these two links 12 and 19 then being able to take the form of a common electric bus. The energy absorber 18 can notably correspond to a set of electrical resistors dissipating the electrical energy in the form of heat, or it can also correspond to a battery storing this energy for subsequent use.

In a particular embodiment, the electric controller 14 of the electric motor comprises a reversible inverter.

Without departing from the scope of the invention, the electric controller 14 of the electric motor and the taxiing control computer 16 can be two separate physical entities as described above or they can also be integrated in a common physical entity.

In operation, whilst the aircraft 2 is taxiing on the surface of an airport, the taxiing control computer 16 receives taxiing commands coming either from a pilot of the aircraft or from an automatic pilot system of the aircraft. The computer 16 is configured to determine control instructions for the electric motor 7 as a function of the commands received and to transmit these instructions to the electric controller of the electric motor 7. As a function of said instructions, the electric controller 14 of the motor applies, on the link 8, electrical signals corresponding to these instructions in order to control the electric motor 7 in accordance with these instructions. The electric motor 7 can, for example, be controlled as a function of a voltage, a current or a cyclic ratio of the PWM (Pulse Width Modulation) type of said electric signals. The taxiing control computer 16 is configured to determine control instructions for the electric motor 7 corresponding to operation of said motor in generator mode, when it receives instructions corresponding to a braking of the aircraft. The energy produced by the motor 7 when it is operating in generator mode is sent to the electric controller 14 of the motor, through the electrical link 8. The electric controller 14 of the motor is configured to send this energy to the energy absorber 18, by means of the link 19. In the particular embodiment in which the electric controller 14 comprises a reversible inverter, this corresponds to operation of said inverter in reversible mode.

The fact of braking the aircraft using the electric motor 7 in generator mode makes it possible to improve the stability of the aircraft, particularly if the braking is carried out during a reversing phase of the aircraft.

In an advantageous embodiment, the taxiing system 1 furthermore comprises a heat absorber 20 associated with the energy absorber 18. This heat absorber 20 comprises at least one phase change material. The use of such a material, sometimes denoted by the acronym PCM (Phase Change Material), makes it possible to reduce the overall dimensions and the mass of the energy absorber 18. The phase change material makes it possible to absorb at the right time, during a phase change of said material, a quantity of energy depending on the volume and the type of the phase change material. This volume of the phase change material is less than the overall volume of the usual heat absorbers (such as for example metal radiators . . . ) which make it possible to evacuate the same quantity of heat from the energy absorber 18. Moreover, the corresponding mass of the phase change material is less than the mass of said usual absorbers. This advantageous embodiment therefore makes it possible to reduce the overall dimensions and the mass of the energy absorber 18.

As non-limiting examples, the phase change material can be paraffin or hydrated salts, organic compounds, eutectic materials, solid-solid solutions, nano-encapsulated materials, etc. This phase change material is chosen such that the temperature of changing from the solid state to the liquid state of said phase change material is lower by a predetermined margin than the maximum operating temperature which the energy absorber 18 and the components and/or elements situated close to the energy absorber 18 can withstand. Thus, in operation, the heat absorber 20 limits the temperature of the energy absorber 18 to said temperature of changing from the solid state to the liquid state of the phase change material, as long as the quantity of heat emitted by the energy absorber 18 remains below the quantity of heat corresponding to the change from the solid state to the liquid state of the phase change material. Consequently, this makes it possible to maintain the energy absorber 18 at a temperature below said predetermined margin at its maximum operating temperature.

Figure 2:
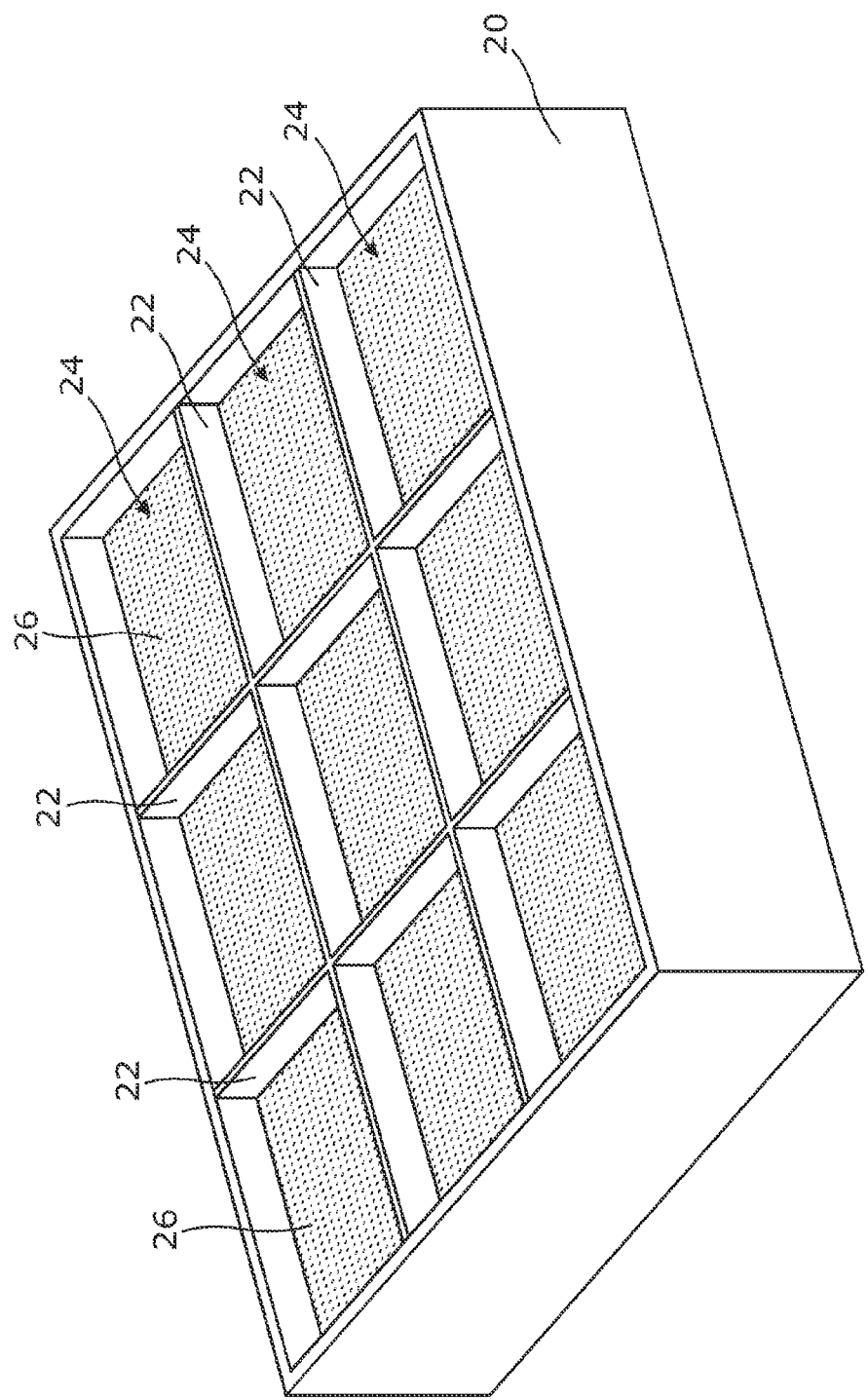
FIG. 2 shows a heat absorber of a taxiing system according to a first embodiment.

In a first embodiment shown in FIG. 2, the heat absorber 20 comprises a plurality of partitions 22 disposed substantially vertically. The concept of vertical is defined in a reference system related to the aircraft when the latter is standing on the ground. In this case, substantially vertical is understood to mean that the absolute value of the angle between the partitions 22 and the vertical is less than 10 degrees. The partitions 22 define a plurality of volumes 24, at least a part of said volumes containing the phase change material 26. This embodiment is particularly advantageous in the case where the phase change material changes from the solid state to the liquid state during a braking of the aircraft preceding the takeoff of said aircraft. This change of the phase change material from the solid state to the liquid state can sometimes take place after such a braking, taking account of the thermal inertia of the energy absorber 18 and/or of the heat absorber 20. During the takeoff phase, the aircraft has to tilt, which gives rise to an inclination of the heat absorber 20 installed in the aircraft. The presence of the partitions 22 makes it possible to contain the liquid phase change material in each of said volumes. If the phase change material solidifies when the aircraft is in this takeoff phase, it therefore solidifies whilst being substantially homogeneously distributed in the heat absorber 20. These partitions make it possible to prevent the phase change material from solidifying mostly in a particular area of the heat absorber 20, other areas of the heat absorber 20 then being able to be at least partially deprived of the phase change material. Moreover, the partitions 22 make it possible to prevent a sloshing of the phase change material 26, due to the effect of movements of the aircraft, when this phase change material is in the liquid state. Advantageously, the partitions 22 are made of a heat-conducting material, for example of metal. This allows a better flow of the heat between the different volumes 24 of said plurality of volumes and, consequently, greater homogeneity of the temperature in the heat absorber 20.

Figure 3:
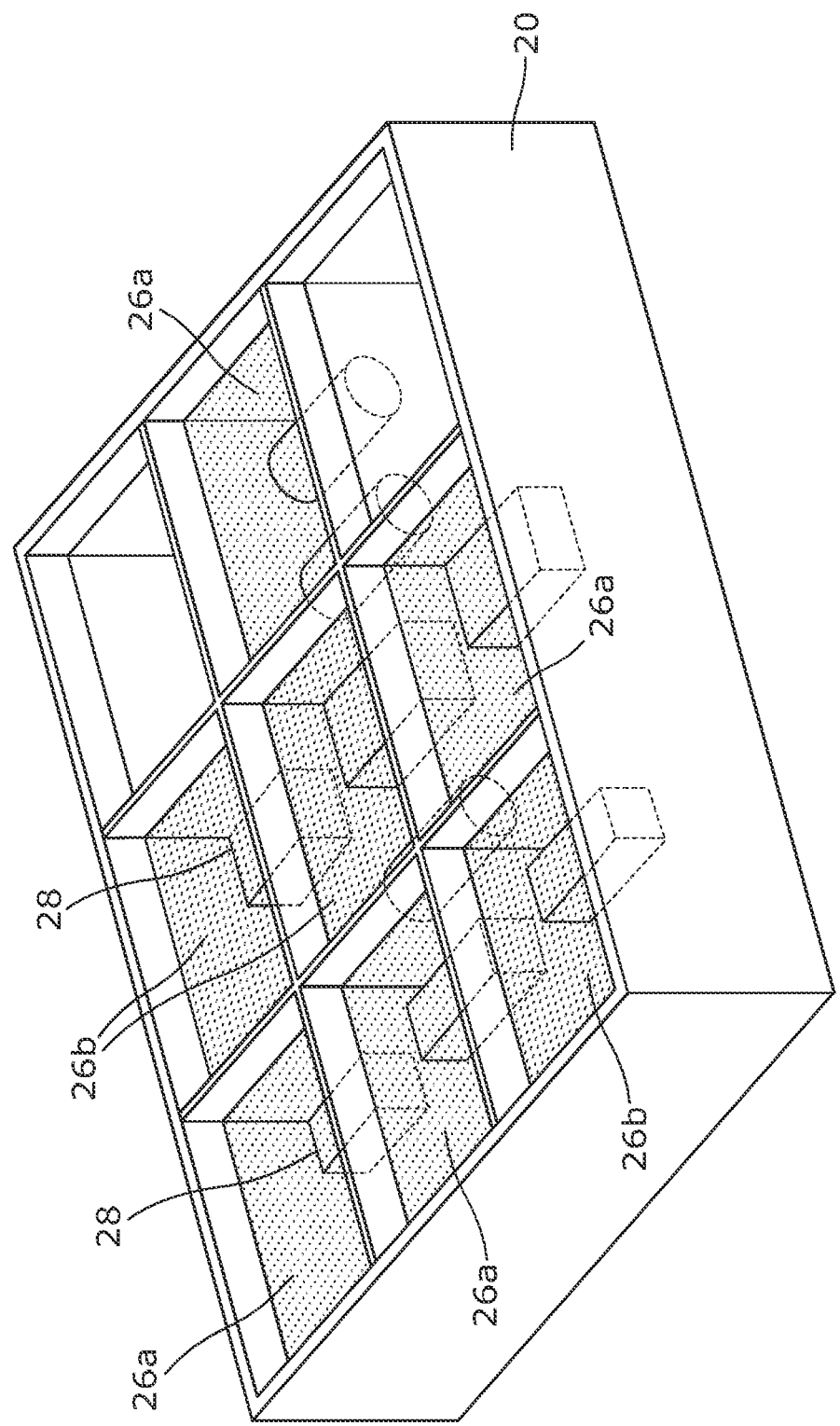
FIG. 3, shows a variant of the heat absorber shown in FIG. 2.

In a variant of the first embodiment shown in FIG. 3, a first portion of the volumes 24 of said plurality of volumes contains a first type of phase change material 26a, and a second portion of said volumes contains a second type of phase change material 26b. The phase change temperature of the second type of phase change material is chosen to be higher than the phase change temperature of the first type of phase change material. Thus, during the absorption of the energy produced by the motor 7 during a braking of the aircraft, the average temperature of the heat absorber 20 rises to a first temperature level corresponding to the phase change temperature of the first type of phase change material 26a and then, when the whole volume of the first type of phase change material has changed from the solid state to the liquid state, this average temperature rises to a second temperature level corresponding to the phase change temperature of the second type of phase change material 26b. This results in a slight rise in the average temperature of the heat absorber 20 during a moderate braking of the aircraft, that is to say a braking for which the energy produced by the motor 7 corresponds to a quantity of heat less than the quantity of heat necessary to cause the first type de phase change material 26a to change from the solid state to the liquid state. In this case, the average temperature of the heat absorber 20 remains limited to the first temperature level. It is only for stronger brakings, for which the energy produced by the motor 7 corresponds to a quantity of heat greater than the quantity of heat necessary to cause the first type de phase change material to change from the solid state to the liquid state, that the average temperature of the heat absorber 20 reaches the second temperature level.

According to a first variant embodiment, the heat absorber 20 associated with the energy absorber 18 is adjacent to and outside of the energy absorber 18. In a second variant, the heat absorber 20 is contained inside the energy absorber 18. In this second variant, when the heat absorber 20 comprises a plurality of partitions 22 disposed substantially vertically according to the first embodiment described above, the phase change material 26, 26a, 26b can be in contact with electrical components 28 (for example electrical resistors) of the heat absorber 20, as shown in FIG. 3. This allows a better transfer of heat from said electrical components 28 to the phase change material.

Figure 5A:
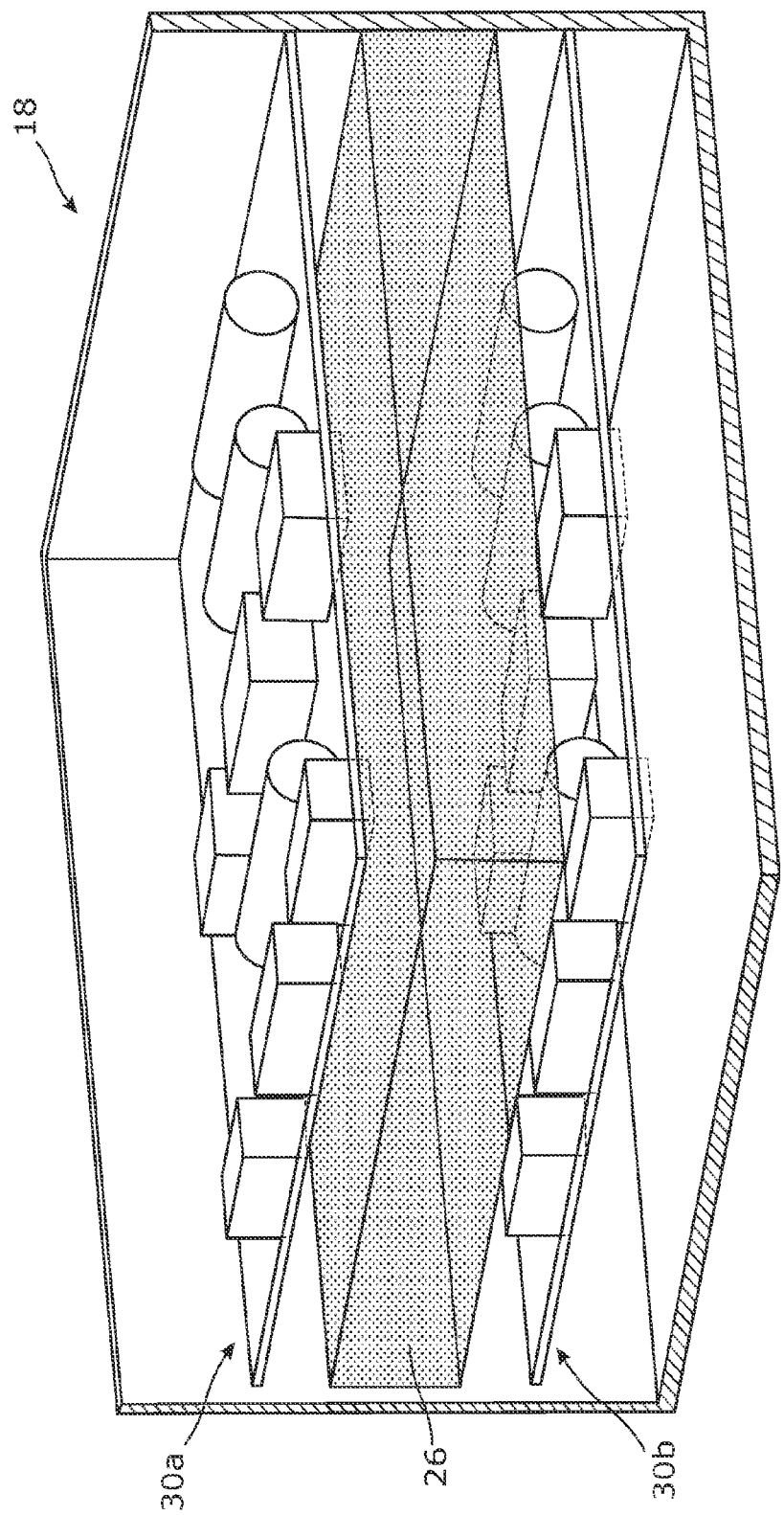
FIG. 5A shows a heat absorber of a taxiing system according to a second embodiment.
Figure 5B:
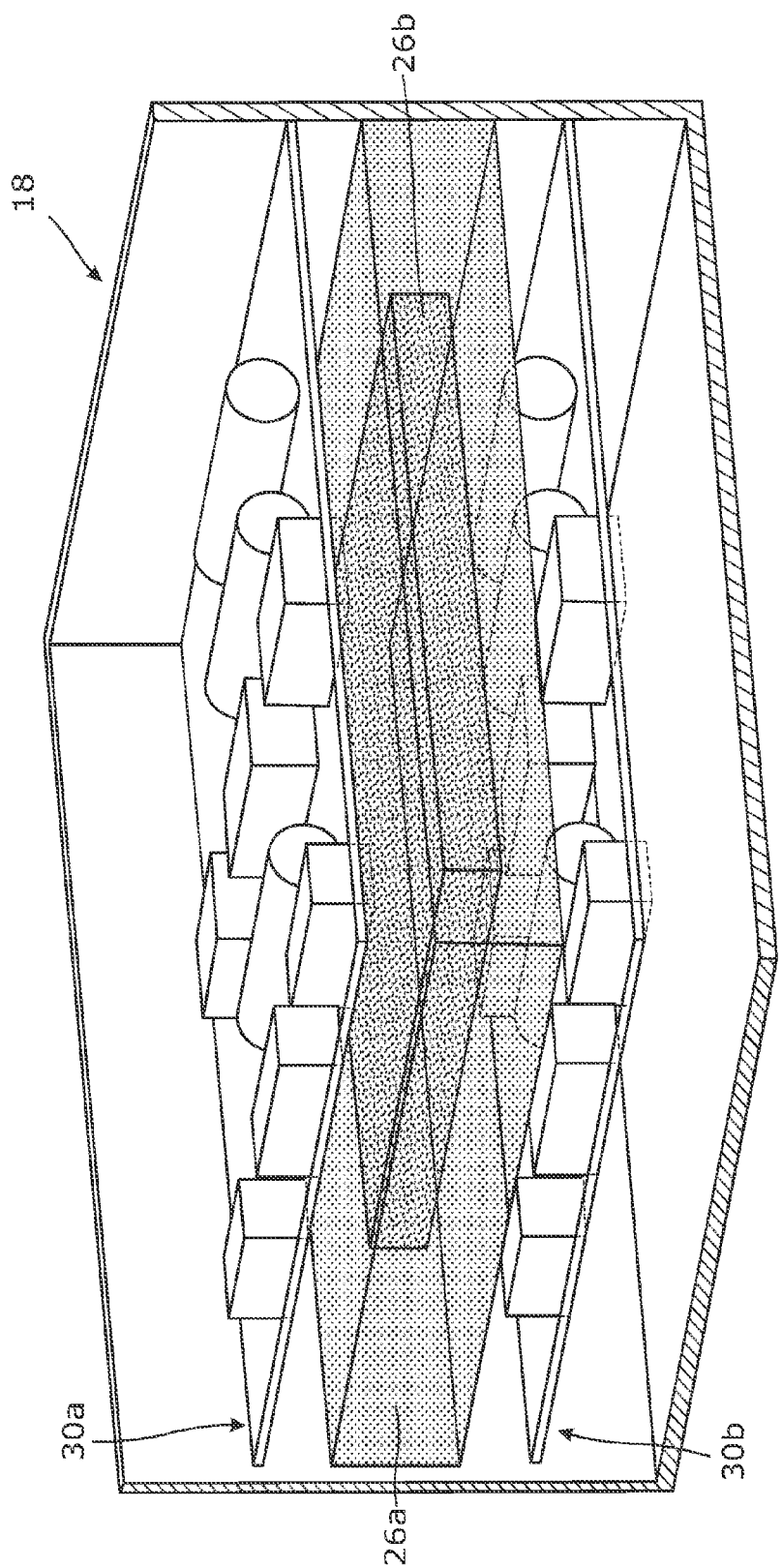
FIG. 5B, shows a variant of the heat absorber shown in FIG. 5A.

In a second embodiment shown in FIG. 5A, the phase change material 26 is at least partially contained between two layers 30a, 30b of electrical components of the energy absorber 18. Each of the two layers can in particular comprise a printed circuit on which said electrical components are placed, notably electrical resistors making it possible to dissipate the electrical energy produced by the motor 7 during a braking of the aircraft in the form of heat. As shown in FIG. 5A, a block of phase change material 26 is disposed between these two layers of electrical components. Thus, the phase change material absorbs the heat emitted by the components of each of the two layers. In a variant shown in FIG. 5B, the phase change material disposed between the two layers of electrical components comprises a block of a first type of phase change material 26a inside of which is contained a second type of phase change material 26b. The advantages of the use of two types of phase change material are those described above with reference to FIG. 3.

Figure 6A:
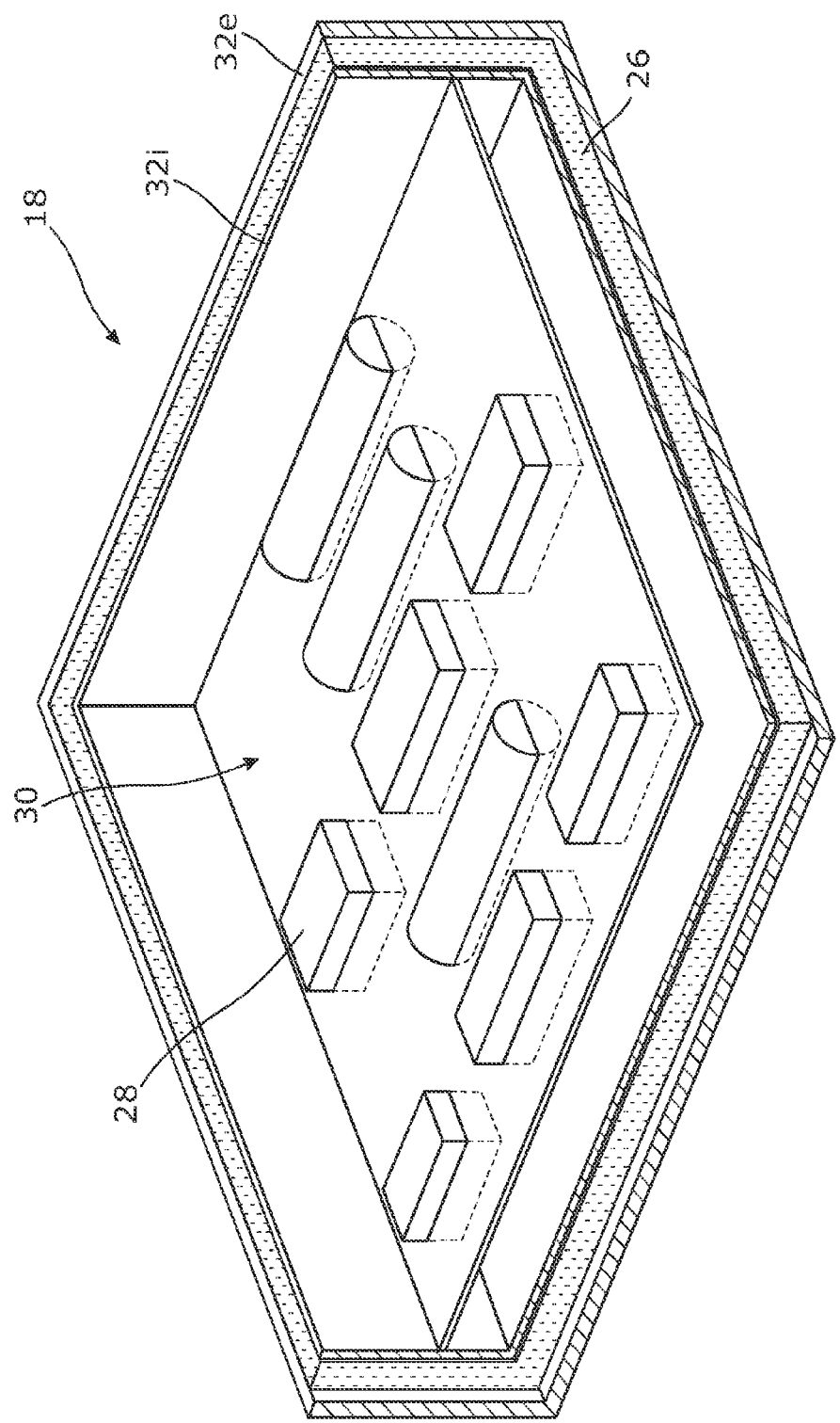
FIG. 6A shows a heat absorber of a taxiing system according to a third embodiment.
Figure 6B:
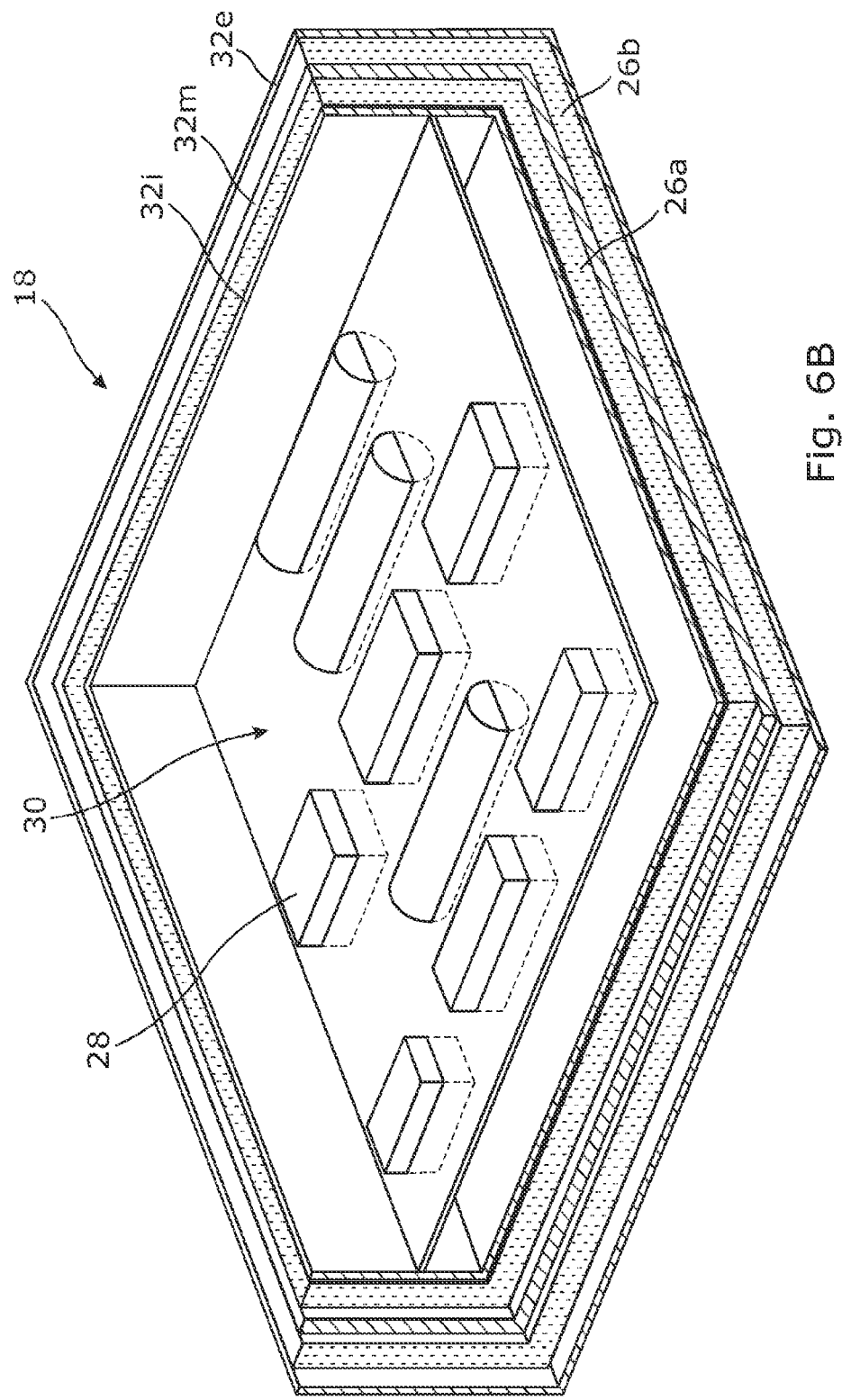
FIG. 6B, shows a variant of the heat absorber shown in FIG. 6A.

In a third embodiment shown in FIG. 6A, the phase change material 26 is placed between an internal wall 32i and an external wall 32e of the energy absorber 18. This internal wall and this external wall form at least a part of a casing surrounding electrical components 28 of said energy absorber 18. In a particular embodiment, the electrical components are arranged in this casing in at least one layer 30, for example on a printed circuit upon which said electrical components are placed. At least the internal wall 32i is made from a heat-conducting material, for example from a metal. This allows the conduction of the heat emitted by the electrical components to the phase change material 26. In this embodiment, the phase change material is not situated on the very inside of the energy absorber 18 but at its periphery, which allows easy access to the electrical components when maintenance operations involving these components have to be carried out. Moreover, as the phase change material is situated at the periphery of the energy absorber 18 rather than in a separate housing, this allows reduced overall dimensions of the assembly formed by the energy absorber 18 and the heat absorber 20. In a variant shown in FIG. 6B, a first type of phase change material 26a is placed between the internal wall 32i and an intermediate wall 32m of the energy absorber 18. A second type of phase change material 26b is placed between this intermediate wall 32m and the external wall 32e of the energy absorber. The intermediate wall 32m is also made of a heat-conducting material, in order to allow the conduction of the heat from the first type of phase change material 26a to the second type of phase change material 26b. The advantages of the use of two types of phase change material are those already described above.

In a fourth embodiment, shown in FIG. 7, the heat absorber 20 is placed outside of the energy absorber 18. More precisely, the heat absorber comprises an enclosure 38, partially shown in the figure, said enclosure containing the phase change material. According to a variant, the heat absorber 20 is connected to the energy absorber 18 by a heat bridge. This heat bridge can for example correspond to a part 34 of the enclosure 38 in contact with the external wall 32 of the energy absorber 18. At least this part 34 of the enclosure 38 and the external wall 32 of the energy absorber 18 are made of a heat-conducting material, for example of metal. This allows the conduction of the heat emitted by the electrical components 28 of the energy absorber 18 to the phase change material of the heat absorber. According to another variant, the heat absorber 20 is connected to the energy absorber 18 by a heat pipe 36 making it possible to conduct the heat emitted by the electrical components 28 of the energy absorber 18, to the phase change material of the heat absorber. Although these two variants are shown simultaneously in the figure, only one of said variants can be implemented without departing from the scope of the invention. The phase change material contained in the enclosure 38 can correspond to a single phase change material, or to a first phase change material 26a inside of which is included a second phase change material 26b as shown in the figure.

Figure 4:
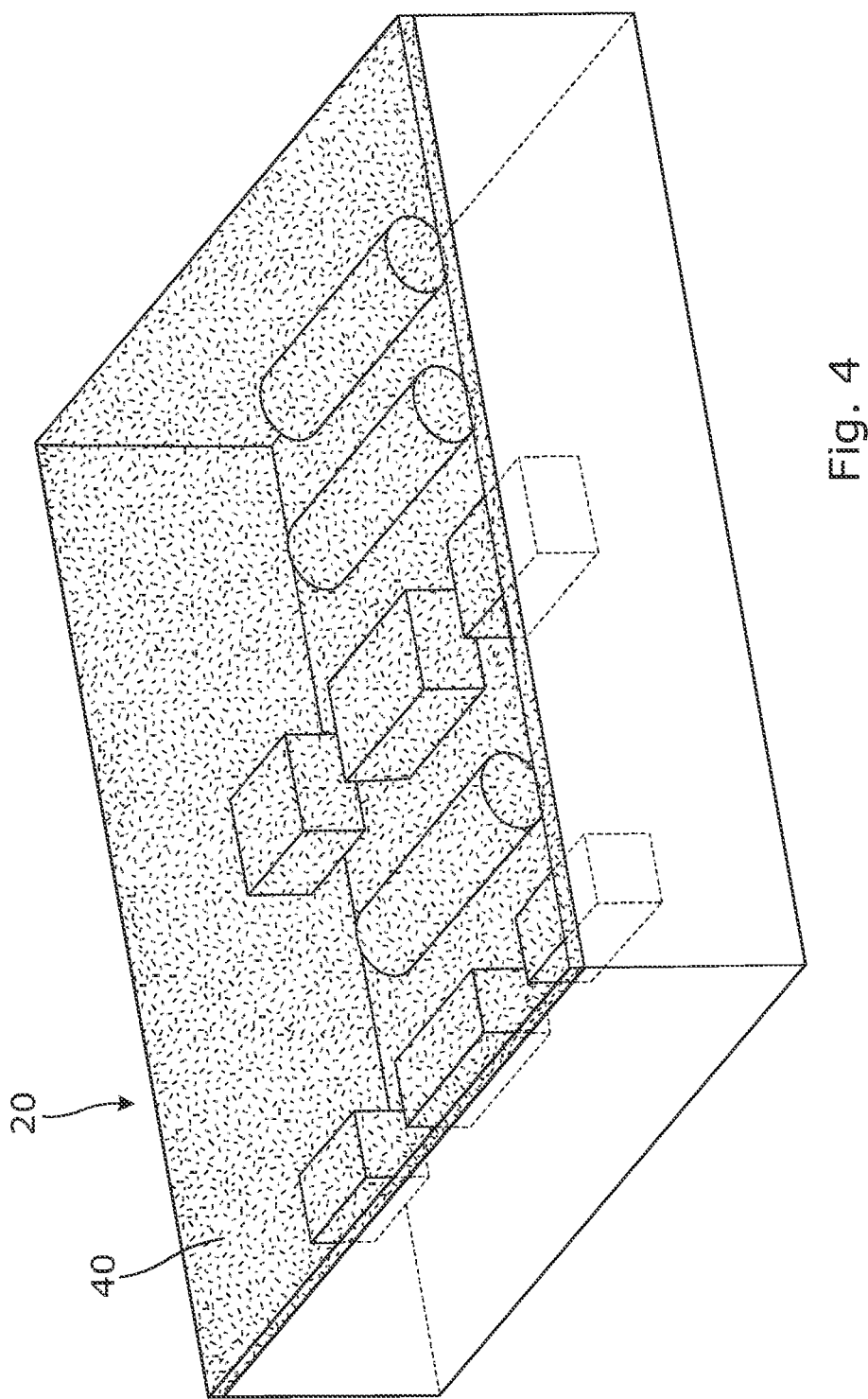
FIG. 4 shows an advantageous embodiment of the upper face of a heat absorber of a taxiing system.

In an advantageous embodiment shown in FIG. 4, the heat absorber 20 comprises an upper face 40 made of a flexible material so as to be able to deform in order to absorb an increase of volume of the phase change material under the effect of an increase of its temperature. This flexible material can for example correspond to a corrugated metal sheet or to rubber or to a flexible plastic material.

In a variant of said advantageous embodiment shown in FIG. 8, the heat absorber 20 comprises an upper face 40 comprising at least one vent 42. The heat absorber 20 is not entirely filled by the phase change material: it contains a layer of air in its upper part. The vents 42 allow the flow of air to outside of the heat absorber 20 during an increase in volume of the phase change material under the effect of an increase of its temperature.

When the phase change material is contained inside the energy absorber 18, said upper face 40 corresponds to an upper face of the energy absorber.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A taxiing system for an aircraft, said aircraft comprising at least one undercarriage comprising at least one wheel, the taxiing system being configured to be installed onboard the aircraft and comprising:
    an electrical power supply;
    at least one electric motor associated with said at least one wheel;
    an electric controller of said at least one electric motor, electrically connected to said at least one electric motor, said electric controller being electrically connected to an output of said electrical power supply; and
    a taxiing control computer connected to the electric controller and configured to determine control instructions for said at least one electric motor and to transmit the control instructions to the electric controller, wherein:
    the taxiing control computer is configured to receive braking of the aircraft commands during the taxiing of the aircraft;
    the taxiing control computer is configured to determine control instructions for said at least one electric motor corresponding to operation of said electric motor in generator mode when the taxiing control computer receives a braking of the aircraft command; and
    the electric controller of said at least one electric motor is connected to an energy absorber making it possible to absorb the electric energy produced by said at least one electric motor when the at least one electric motor is operating in generator mode,
    and wherein the taxiing system comprises a heat absorber associated with the energy absorber, the heat absorber comprising at least one phase change material.

2. The taxiing system as claimed in claim 1, wherein the heat absorber comprises a plurality of partitions disposed substantially vertically, the partitions delimiting a plurality of volumes containing said at least one phase change material.

3. The taxiing system as claimed in claim 2,
    wherein the heat absorber comprises a first type of phase change material and a second type of phase change material, and
    wherein a first part of said plurality of volumes contains the first type of phase change material and a second part of said plurality of volumes contains the second type of phase change material.

4. The taxiing system as claimed in claim 3, wherein the first type of phase change material is contained in a first volume, the second type of phase change material is contained in a second volume, and the second volume is included in the first volume.

5. The taxiing system as claimed in one of claim 1, wherein the heat absorber comprises a first type of phase change material and a second type of phase change material.

6. The taxiing system as claimed in claim 1, wherein said at least one phase change material is contained inside the energy absorber.

7. The taxiing system as claimed in claim 6, wherein said at least one phase change material is in contact with electrical components of the energy absorber.

8. The taxiing system as claimed in claim 6, wherein said at least one phase change material is at least partially contained in a volume situated between two layers of electrical components of the energy absorber.

9. The taxiing system as claimed in claim 1, wherein said at least one phase change material is contained in an enclosure at least partially surrounding the energy absorber.

10. The taxiing system as claimed in claim 1, wherein said at least one phase change material of the heat absorber is contained in an enclosure outside of the energy absorber, the heat absorber being connected to a part of the energy absorber containing electrical components by a heat bridge or by a heat pipe.

11. The taxiing system as claimed in claim 1, wherein said at least one phase change material is contained in an enclosure comprising at least one flexible part capable of being deformed in order to absorb an increase of volume of said at least one phase change material under the effect of an increase of its temperature.

12. The taxiing system as claimed in claim 1, wherein said at least one phase change material is contained in an enclosure comprising an upper face comprising at least one vent.

13. An aircraft comprising:
    at least one undercarriage comprising at least one wheel; and
    a taxiing system comprising:
        an electrical power supply;
        at least one electric motor associated with said at least one wheel;
        an electric controller of said at least one electric motor, electrically connected to said at least one electric motor, said electric controller being electrically connected to an output of said electrical power supply; and
        a taxiing control computer connected to the electric controller and configured to determine control instructions for said at least one electric motor and to transmit the control instructions to the electric controller, wherein:

the taxiing control computer is configured to receive braking of the aircraft commands during the taxiing of the aircraft;

the taxiing control computer is configured to determine control instructions for said at least one electric motor corresponding to operation of said electric motor in generator mode when the taxiing control computer receives a braking of the aircraft command; and the electric controller of said at least one electric motor is connected to an energy absorber making it possible to absorb the electric energy produced by said at least one electric motor when the at least one electric motor is operating in generator mode, and wherein the taxiing system comprises a heat absorber associated with the energy absorber, the heat absorber comprising at least one phase change material.

* * * * *